May 8, 1945.  R. J. RANDALL  2,375,493
APPARATUS FOR COATING
Filed June 14, 1941  3 Sheets-Sheet 1
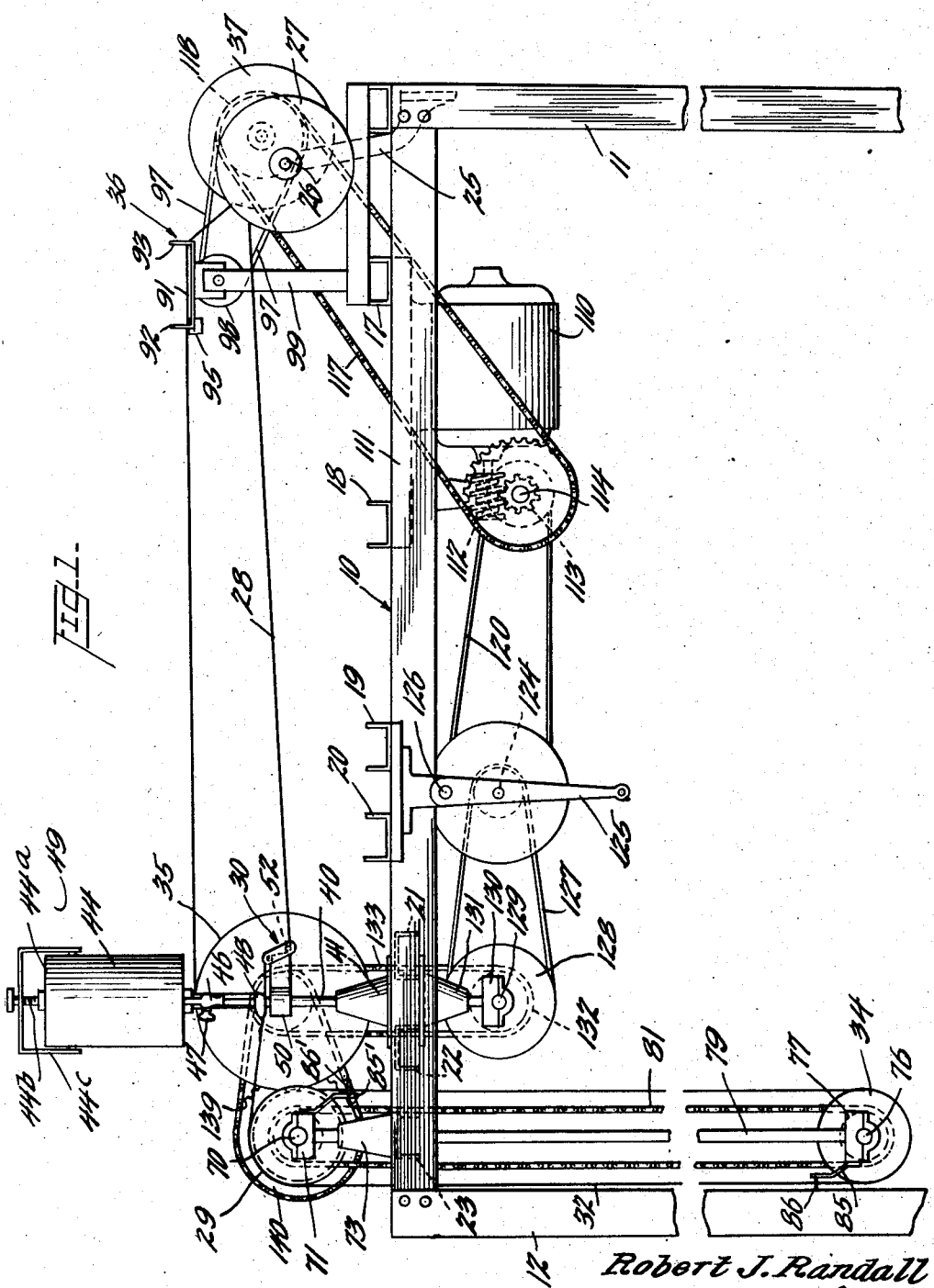
Robert J. Randall May 8, 1945.  R. J. RANDALL  2,375,493
APPARATUS FOR COATING
Filed June 14, 1941  3 Sheets-Sheet 2
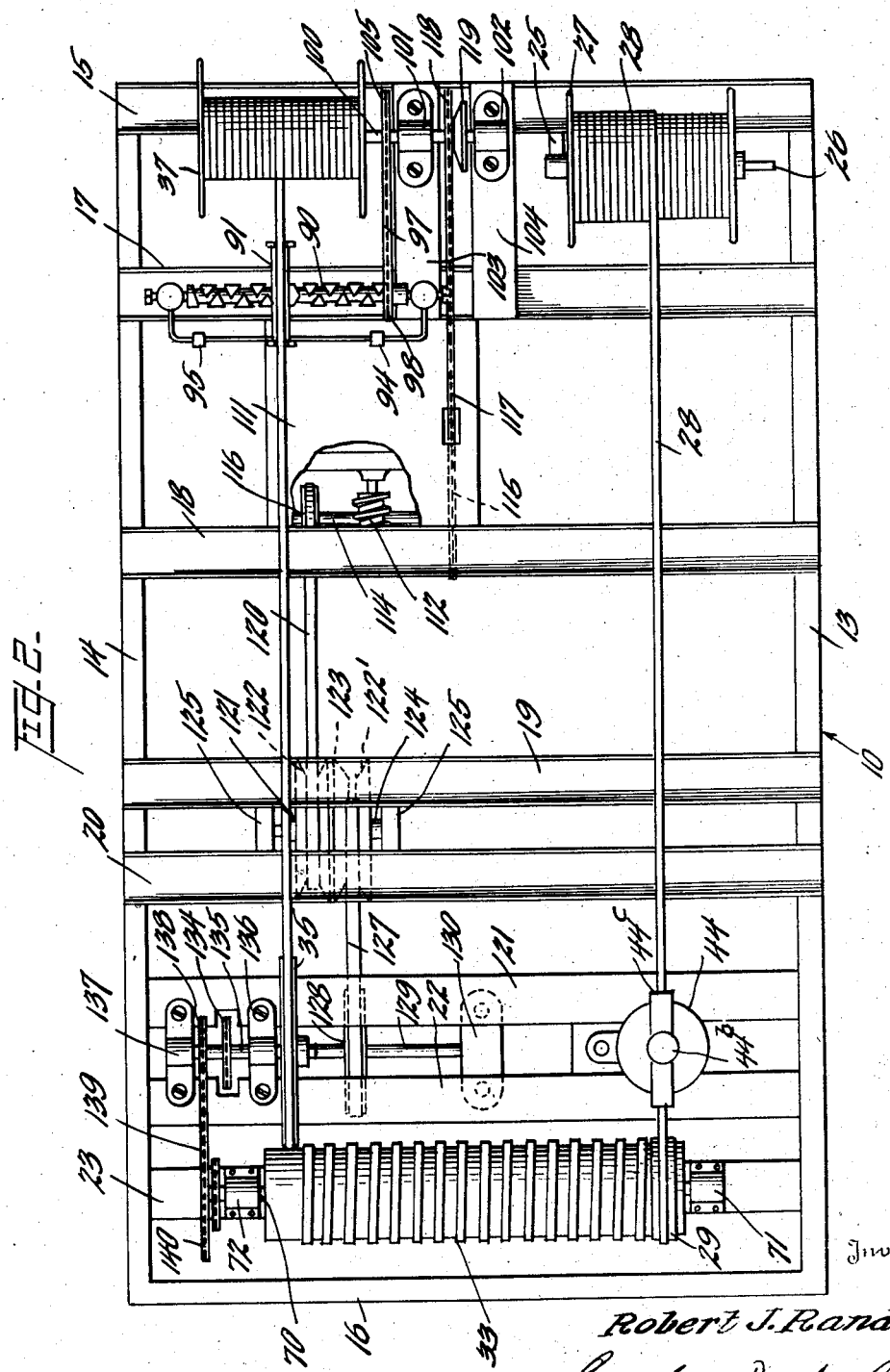
Inventor
Robert J. Randall,
By Cushman Darby Cushman
Attorney

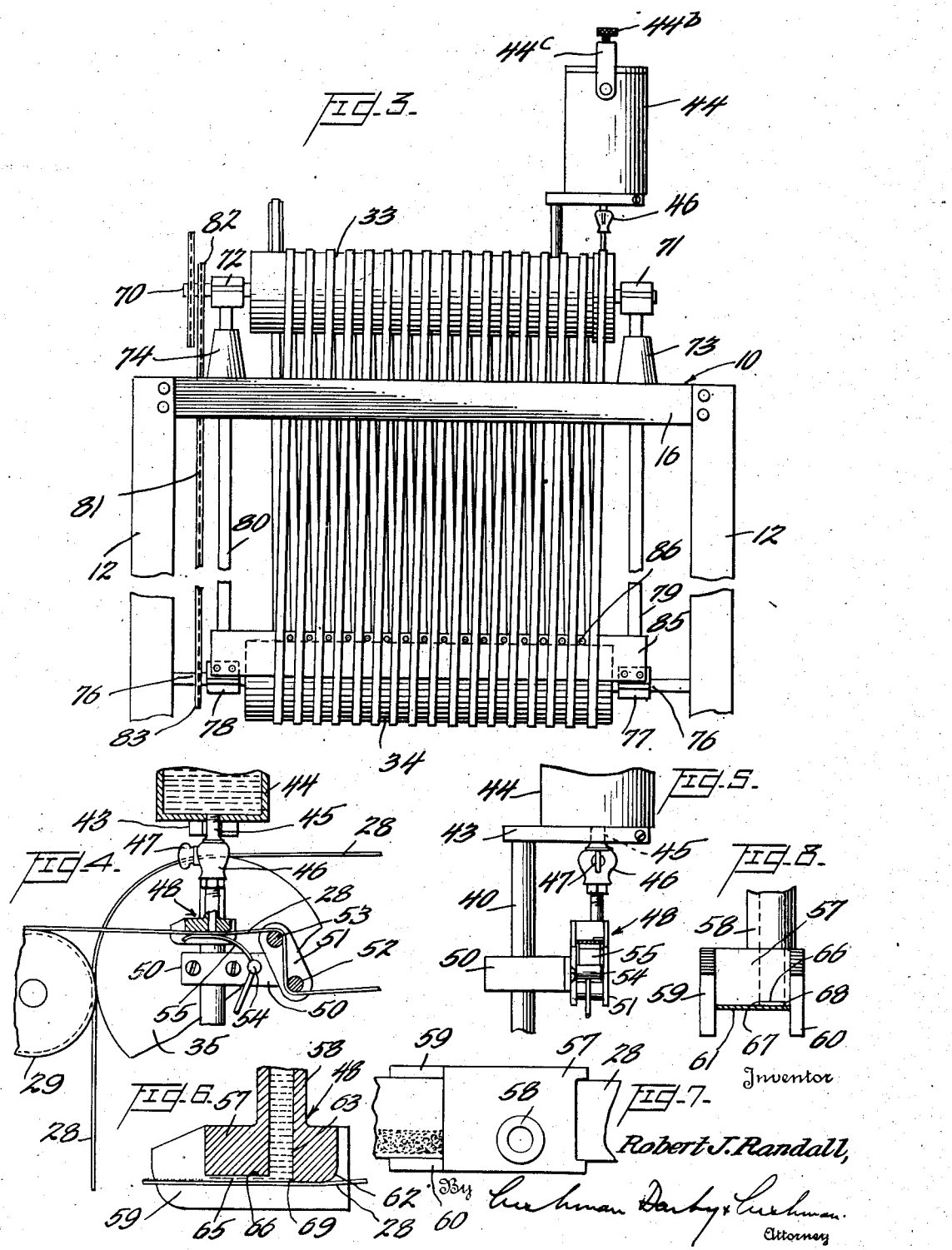

Patented May 8, 1945

2,375,493

UNITED STATES PATENT OFFICE 2,375,493

APPARATUS FOR COATING

Robert J. Randall, East Orange, N. J., assignor to Reiss Manufacturing Corp., Jersey City, N. J., a corporation of Delaware Application June 14, 1941, Serial No. 398,149

8 Claims. (Cl. 91—17)

The present invention relates to an apparatus for coating and, more particularly, to machines for applying coating material to elongated sheets or strips of flexible material, such as tape or the like.

The primary object of the invention is to improve the art of coating elongated sheets or strips, with such materials as thermoplastic adhesives or the like. An object of the invention is to improve the accuracy of control of the application of the coating materials, with particular reference to position, width and thickness of the applied coating.

A further object of the invention is to provide an apparatus for applying to relatively narrow strips, such as tape, an accurately positioned, narrow stripe of coating material, such as thermoplastic adhesive, of less width than the tape to which the stripe is applied.

A further object of the invention is to provide an apparatus for so coating a tape or the like with a thermoplastic adhesive as to prevent wrinkling, ruffling, twisting or curving in the finished product.

Another object of the invention is to provide an improved, high-speed apparatus for accurately coating tape with such an adhesive and for drying or setting the adhesive in an improved manner, before it is reeled up onto a spool or the like.

Although not confined to such use, the invention of the present application is particularly adapted for the manufacture of adhesively coated tape employed in the tailoring industry for such purposes as securing in place, stiffening lining materials for coats and the like, in accordance with the disclosure of the copending application of Raymond H. Reiss and Robert J. Randall, Serial No. 398,148, filed June 14, 1941, now Patent 2,275,090. As pointed out in that application, it is desirable to provide a tape of textile material or the like, having one surface thereof coated with a stripe of thermoplastic adhesive, extending substantially from one margin of the tape to or slightly short of the center line of the tape, so that the uncoated portion may be sewed to the edge of the garment plies and the adhesively coated portion of the tape secured by the application of heat and pressure to a marginal portion of the stiffening lining or the like.

The present invention provides a new and improved apparatus for applying to a tape (such as a woven textile tape) an accurately positioned stripe of thermoplastic adhesive of accurately controlled thickness.

It must be understood, however, that the invention is not limited to the manufacture of tape for the uses and purposes described in the above identified application, as it is useful in the broad field of coating, and may be employed in the manufacture of many other types of articles.

Other and further objects and advantages of the invention will become apparent from a consideration of the following description of a specific embodiment of the invention, illustrated in the accompanying drawings and described below.

In the drawings:

Figure 1 is a side elevation of an apparatus in accordance with the invention.

Figure 2 is a plan view of the apparatus of Figure 1.

Figure 3 is an end elevation, looking from the left of Figures 1 and 2.

Figure 4 is a fragmentary vertical section and partial elevation, showing a preferred adhesive applicator assembly and tape tensioning device.

Figure 5 is an elevation, looking from the left of Figure 4.

Figure 6 is an enlarged sectional view of the adhesive applicator head shown in Figure 4.

Figure 7 is a plan view of the parts shown in Figure 6, and

Figure 8 is an end elevation, looking from the left of Figures 6 and 7.

The operating elements of the apparatus of the present invention are mounted upon a frame comprising a table 10 supported by front legs 11 and rear legs 12, the table being made up of longitudinal side frame members 13, 14, transverse end members 15, 16 and intermediate transverse channel members 17, 18, 19, 20, 21, 22 and 23.

An upwardly extending arm 25 carried by the frame at the forward end of the machine supports a fixed, horizontally projecting rod 26, upon which a spool 27 carrying a supply of uncoated tape 28 may be mounted for unwinding rotation with respect thereto. The tape 28 is drawn from the spool by a roll 29, described below, through a tensioning device 30 and an adhesive applicator 48. From the roll 29, the coated tape is guided through a drying zone along a spiral path through a plurality of loops 32 over rolls 33, 34 of reduced diameter. At the end of the drying zone, the strip is led over a freely rotatable roll 35 and then back to the forward end of the machine where a travelling guide or level winder 36 delivers the same to a spool 37, driven by a relatively light-pressure slip type friction clutch adapted to apply only slight tension to the tape in rewinding the same. The roll 35 may peripherally contact the roll 29 and be driven thereby, the tape being carried between the rolls 35 and 29 in the manner of a pinch roll assembly, or the roll 35 may be spaced from the roll 29.

The coating assembly is carried by a post 40, secured at its lower end in a pedestal 41 mounted upon the transverse frame members 21, 22. At the upper end of the post 40, there is a horizontally projecting bracket 43, supporting a coating material reservoir 44 having a downwardly projecting discharge pipe 45 provided with a valve 46, adapted to be closed by manipulation of a handle 47. The lower end of the valve casing carries an adhesive applicator head represented generally at 48 and described in detail below.

The upper, open end of the reservoir 44 may be closed by an air-tight cover 44a, clamped in closed position by a bolt 44b threaded into a bail 44c carried by the reservoir, as shown in Figures 1, 2, and 3. An air line 49 is adapted to lead air under predetermined, regulated pressure from any suitable source to the interior of the reservoir, to effect a force feed of the relatively high viscous adhesive from the reservoir to the applicator head.

The adhesive employed is preferably a cellulose derivative composition, such as cellulose acetate combined with suitable plasticiers in a suitable solvent. The invention, of course, is not confined to the use of this particular type of coating composition, as any coating material desired may be used, depending upon the ultimate use of the coated product. In the manufacture of tape of the type described in the aforementioned copending application, such thermoplastic adhesives are highly satisfactory, since they dry readily at room temperatures, are non-tacky at room temperatures, are not adversely affected by standard cleaning fluids and are rendered adhesive only upon the application of relatively high degrees of temperature. The invention of the above application, of course, can be practiced with adhesives other than thermoplastic adhesives and the present invention contemplates applying adhesives of any type to tapes, sheets or strips.

The post 40 also carries a rearwardly projecting bracket 50 having a plate 51 secured thereto, from which a pair of spaced, tape tensioning pins 52, 53 project laterally. The bracket 50 also carries a post 54, to which there is secured an upwardly and rearwardly projecting leaf spring 55, adapted to urge the tape 28 into firm contact with the undersurface of the adhesive applicator head 48, the tension on the spring being adjusted by changing the angular position of the post 54.

As shown in Figures 6–8, the applicator head 48 comprises a central block 57 having an upwardly projecting pipe section 58 and downwardly projecting side guide members 59, 60, which may be integral with the block or secured to the side faces thereof by any appropriate means. The lower surface 61 of the block 57 is substantially plane throughout the major portion thereof and is normal to the side walls 59, 60, but at its forward end is rounded and curved upwardly as at 62, to facilitate engagement of the tape 28 therewith.

The block 57 is provided with a vertical bore 63 extending through the pipe section 58 and communicating with its undersurface 61. A portion of the latter surface is cut away or otherwise relieved, thereby providing a rearwardly extending, downwardly facing channel or groove 65, communicating at its forward end with the conduit 63 and extending to and opening at the rear end of the block. The channel is defined by a flat wall 66, parallel to the surface 61 and the adjacent surface of the tape 28 and spaced a predetermined distance therefrom. The channel also has side walls 67, 68, one approaching but preferably spaced from the center line of the tape and the other positioned as closely to the adjacent side edge of the tape as is practical.

It will be understood that, as the tape is drawn beneath the applicator head, adhesive flows under pressure from the reservoir 44 through the conduit 63 to the groove or channel 65, where it is applied to the tape and moves rearwardly therewith, away from the applicator head. The adhesive is prevented from flowing forwardly by the end abutment wall 69 of the groove. The top wall 66 accurately determines the thickness of the stripe applied to the tape, while the side walls 67, 68 thereof delineate the side margins of the applied stripe. As stated above, the side wall 68 is positioned as close to the side edge of the block as is practical, since the stripe is preferably applied to the surface of the tape as closely as possible to one edge thereof. Care is taken, however, to prevent the adhesive from being applied to the edge face of the tape, since if that were done, the adhesive might work around to the opposite surface thereof, which is undesirable.

In the embodiment of the invention illustrated, the stripe is applied to one face of the tape adjacent only one margin thereof, but, by making obvious changes in the number, position or size of the groove 65, the adhesive may be applied at any other relative positions or applied over substantially the entire width of the tape, as desired.

From the applicator head 48, the tape is led over the drawing roll 29 which preferably comprises an enlarged section of the elongated roll 33, the section 29 being covered with friction increasing material, such as rubber or the like. The roll 33 is carried by a shaft 70 journalled in bearings 71, 72 carried by pedestals 73, 74, supported upon the transverse frame member 23.

As the tape is drawn under the applicator head 48, it is placed under substantial tension by reason of the fact that it is led under and over the tension pins 52, 53 and over the leaf spring 55. Hence, the tape is stretched somewhat as the adhesive is applied, thereby enlarging the interstices in the tape and facilitating the impregnation thereof by the adhesive.

The tape is delivered from the enlarged section 29 of the upper roll 33 by a downward run to the roll 34, which is of the same diameter as the reduced section of roll 33. The roll 34 is secured to shaft 76 journalled in bearings 77, 78 carried by rods 79, 80 hung from the pedestals 73, 74 supported by the transverse member 23. A chain 81, trained about sprockets 82, 83 fast on the shafts 70, 76, respectively, causes the rolls to be positively rotated in unison.

Since the tape drawing roll section 29 is of larger diameter than the rolls 33, 34, it moves at greater peripheral speed than the last-mentioned rolls, thereby permitting the tension on the tape as the latter leaves the enlarged section 29 to be relieved and permitting the tape to contract or shrink to its original condition.

The bearings 77, 78 for the lower roll shaft 76, carry a transversely extending plate 85, disposed behind the downwardly travelling runs of the tape in the loops 32. The plate has forwardly projecting pins 86, appropriately spaced therealong, serving as a guide comb for the loops and maintaining them in properly spaced relation. A similar plate 85', carried by the upper bearings 71, 72, has rearwardly projecting comb fingers 86', disposed in engagement with the upwardly travelling runs of the loops to guide the latter in the same manner.

The adhesive on the tape is dried or set, as it passes through the loops trained about the rolls 33, 34 and any appropriate means may be provided to facilitate this action, such as heaters, blowers, infra-red ray lamps or the like.

The last upwardly travelling run of the tape is trained for movement over the pinch or idler roll 35, from which it is drawn through the level winding apparatus 36, to the reel 37. Since level winding devices are well understood in the art, the one shown diagrammatically in the accompanying drawings need not be described in detail. It comprises a continuously rotating shaft 90 having left and right-hand threads in its periphery, a traveller 91 mounted for traversing movement along the shaft under the control of a pivoted thread follower (not shown), a pair of U-shaped guides 92, 93 carried by the traveller, and stops 94, 95 adapted to limit the movements of the traveller. The shaft 90 is rotated by a chain 97 trained about a sprocket 98 fast on the shaft, as hereinafter explained. The level winding assembly as a whole is supported by posts 99 (Fig. 1) carried by the transverse frame member 17.

The wind-up spool 37 is fixed upon a shaft 100 journalled in bearings 101, 102 mounted upon short, longitudinally extending channel members 103, 104, spanning the space between the end frame 15 and the transverse member 17, the shaft 100 being unsupported at one of its ends, to permit the spool 37 to be placed thereon and removed therefrom. Any appropriate means may be provided to establish a positive driving connection between the shaft 100 and the spool 37 and the shaft carries a sprocket 105 about which the chain 97 is trained, whereby the threaded shaft 90 rotates at predetermined ratio with respect to the spool 37.

An electric motor 110 having a base 111 is hung from the undersurface of the transverse frame members 17, 18, and the motor shaft carries a worm 112 in mesh with a worm follower 113 on a counter-shaft 114 having a sprocket 115 on one end and a sheave 116 on its other end. The sprocket 115 is connected by a chain 117 to a sprocket 118 journalled about the shaft 100 and connected thereto by a normally slipping friction clutch 119. Hence, a relatively light rotational force is imparted to the shaft 100 and the reel 37 to wind up the coated tape under substantially constant, relatively light tension. This arrangement also serves to compensate for decreasing speed of rotation on the part of the spool, as the diameter of the body of tape being wound thereon increases.

A V-belt 120 trained about the sheave 116 extends rearwardly to a Toledo variable speed drive assembly 121, comprising fixed heads 122, 122' and an axially movable intermediate head 123 mounted on the shaft 124 carried by levers 125, pivoted at 126 for swinging movement relative to the frame. A V-belt 127 trained for movement in the space between the fixed head 122 and the axially movable, intermediate head 123 drives a sheave 128 fast on counter-shaft 129, journalled in bearings 130, supported beneath the frame by hangers 131 carried by the transverse frame members 21, 22. As is well understood in the art relating to such variable speed transmission devices, when the variable speed assembly is swung in one direction or the other, the effective diameter of one sheave is increased and the other is correspondingly decreased, thereby varying the speed ratio between the driving belt 120 and the driven belt 127.

A sprocket 132 fast on the counter-shaft 129 is connected by an upwardly extending chain 133 to a sprocket 134 fixed to a stub shaft 135 journalled in bearings 136, 137 carried by supports projecting upwardly from the transverse frame members 21, 22. The roller 35, which delivers the tape from the drying zone to the wind-up mechanism, is journalled upon the shaft 135 for free rotation relative thereto. A sprocket 138, fast on the shaft 135, is connected by a chain 139 to a relatively large sprocket 140 fixed to the shaft 70 of the upper roll 31. As pointed out above, roll 33 is connected to the lower roll 34 by a chain 81 trained about sprocket 82, 83 fast on the roll shafts.

It is thought that the operation of the apparatus of the present invention will be entirely clear from the foregoing description. A supply of tape 28 wound on spool 27 is placed in the apparatus by slipping the spool upon the supporting rod 26. In the specific embodiment referred to above, the tape is formed of woven fabric material, substantially three-eighths of an inch in width. The tape is led through the tension device 30 and under the applicator head 31, from which point it passes over the drawing roll 29 and around the elongated rolls of reduced diameter 33, 34, in a generally spiral path. As the tape is drawn beneath the applicator head, a layer of thermoplastic adhesive is deposited thereon, the tape being under substantial tension at that time. When it passes from the roll 29 to the rolls of reduced diameter, the speed of movement of the tape is slightly reduced so as to relieve the tension therein and to permit the tape to contract substantially immediately to its original condition. It is important that this contraction take place before the adhesive has had time to dry or set. If the adhesive were permitted to dry while the tape was in the stretched condition, the coated portion would not be able to contract when the tension was eventually relieved. This would result in an uneven, wrinkled, curved or ruffled effect in the finished product, due to the unequal contraction of different portions of the tape.

It is also important in producing a coated tape in accordance with and for the purposes of the present invention, that the tape be in the natural, non-tensioned condition, as distinguished from a longitudinally compressed, compacted or condensed condition, which would result in a crepe effect in the finished product, making the product elastic or longitudinally stretchable. Where the term "natural, non-tensioned condition" is used in the appended claims, it refers to a condition where the tape is subjected neither to longitudinal compression, compacting, condensing nor stretching forces.

The last run of the tape in the drying zone is led upwardly over the outfeed roll 35, and then through the level winder to the spool 37, where the finished product is wound up. When the spool has been filled, it may be removed and another empty spool substituted therefor.

It must be understood that the invention is not limited to the details of construction or arrangement of parts shown in the accompanying drawings and described above. The applicator head may be modified in many ways that will be apparent to one skilled in the art, if the characteristics of the coating or coatings to be applied are to be changed. If it is desired to apply adhesive or other coating material in a plurality of superimposed layers or coats, a plurality of applicator heads may be positioned to operate successively upon the strip material. Moreover, if it is desired to apply a thermoplastic adhesive in the absence of a solvent, that operation may be accomplished by associating appropriate heaters with the adhesive reservoir, to maintain the material in plastic condition at all times. Similar heaters may be associated with the applicator head and the conduit led thereto, if it is desired to raise the fluidity of the adhesive, with or without the use of solvents.

It must be further understood that the invention is not confined to the use of thermoplastic adhesives or in fact to the application of adhesive materials to tapes, as the apparatus disclosed herein is useful in the broad field of coating or otherwise treating strip or sheet material.

It should be understood therefore that the invention includes all modifications, as to apparatus, coming within the scope of the appended claims and their equivalents.

I claim:

1. An apparatus for coating tape or the like comprising means for moving the tape in the direction of its length, means for applying tension to a section of the moving tape, means for applying a continuous layer of coating composition to one surface of the tape while under tension, means for relieving the tension in the tape substantially immediately after the application of the coating composition and before the latter has dried or set, and means for guiding the tape in its natural, non-tensioned condition through an elongated path to dry or set the coating composition.

2. An apparatus for coating tape or the like comprising means for moving the tape lengthwise through a predetermined path including a coating zone and a drying zone, means in the coating zone for applying predetermined tension to the tape, means for applying to one surface of the tensioned tape a continuous layer of coating composition of a width less than the tape, and means for relieving the tension in the tape in said drying zone.

3. An apparatus for applying a relatively narrow stripe of thermoplastic adhesive material to one surface of a tape which comprises adhesive depositing means, means for drawing the tape therepast, means for applying predetermined tension to the tape as it is drawn past said depositing means, means for guiding the coated tape through an elongated, substantially spiral path including a plurality of successive loops, and means for relieving the tension on the tape as it passes through said loops, to effect drying of the adhesive while the tape is in non-tensioned condition.

4. Apparatus for applying a relatively narrow stripe of thermoplastic adhesive to one surface of an elongated tape, comprising an adhesive depositing assembly, means for drawing the tape through the assembly at a predetermined speed, means for applying predetermined tension to the tape as it is drawn through said assembly, means for receiving the coated tape from the tape drawing means, and means associated with said receiving means for moving the tape in non-compressed relation at a slightly lower rate of speed than said drawing means, thereby to relieve the tension in the tape and to move the same in its natural, non-tensioned condition while permitting the adhesive to set.

5. An apparatus for coating tape or the like comprising a coating assembly, a tape drawing roll positioned beyond the assembly, tape tensioning means ahead of the assembly, means for rotating the drawing roll at a predetermined peripheral speed to draw the tape through the assembly under tension at a corresponding speed, tape receiving, guiding and advancing roll means positioned to receive the coated tape from said drawing roll and to accommodate the tape until the coating has set, and means for rotating the receiving, guiding and advancing roll means at a lower peripheral speed than said drawing roll, whereby the tension on the tape is relieved and the tape assumes its natural, non-tensioned condition prior to the setting of said coating.

6. An apparatus for coating tape or the like comprising a coating assembly, a tape drawing roll of predetermined diameter beyond the assembly, tape tensioning means ahead of the assembly, means for rotating the roll at a predetermined speed to draw the tape through the assembly under tension at a corresponding speed, tape receiving, guiding and advancing roll means of smaller diameter than the tape drawing roll and positioned to receive the coated tape therefrom, means for rotating said roll means at the same speed as the drawing roll, whereby tension in the tape is relieved when the tape is delivered by the larger roll to the smaller roll means.

7. An apparatus for coating tape or the like comprising a tape coating assembly, tape tensioning means ahead of the assembly, an elongated positively driven roll beyond the assembly having an enlarged section aligned with the assembly and the tensioning means and adapted to draw the tape under tension therethrough and a section of reduced diameter adjacent thereto, and means for guiding the tape from the enlarged section through a plurality of loops over the section of reduced diameter, whereby the speed of the tape moving through the loops is reduced as compared with its movement over the enlarged section, and tension in the tape is relieved.

8. An apparatus for coating tape or the like comprising a coating assembly, tape tensioning means ahead of the assembly, an elongated positively driven roll beyond the assembly having an enlarged section aligned with the assembly and the tensioning means and adapted to draw the tape under tension therethrough and a section of reduced diameter adjacent thereto, a second elongated roll spaced from the first and positively driven at the same rate as the first roll and of a diameter equal to the reduced section of the first roll, and means for guiding the tape from the enlarged section of the first roll through a plurality of loops trained about the reduced section thereof and about the second roll, whereby the speed of the tape moving through the loops is reduced and tension on the tape is relieved as it is received by the reduced rolls.

ROBERT J. RANDALL.